United States Patent
Huang

(10) Patent No.: US 6,924,831 B2
(45) Date of Patent: Aug. 2, 2005

(54) VIDEO TELEPHONE INTEGRATING PUBLIC-SWITCH TELEPHONE NETWORK AND ASYMMETRIC DIGITAL SUBSCRIBER LINE

(75) Inventor: Chen-Su Huang, Taipei (TW)

(73) Assignees: Aevoe Incorporated, Taipei (TW); Cheng-Su Huang, Taipei (TW)

( * ) Notice: Subject to any disclaimer, the term of this patent is extended or adjusted under 35 U.S.C. 154(b) by 0 days.

(21) Appl. No.: 10/660,500

(22) Filed: Sep. 12, 2003

(65) Prior Publication Data

US 2005/0057644 A1 Mar. 17, 2005

(51) Int. Cl.$^7$ .............................................. H04N 7/14
(52) U.S. Cl. .............................. 348/14.12; 348/14.01
(58) Field of Search ..................... 348/14.01–14.16; 709/217; 379/93.05, 93.17, 93.21, 90.01, 93.06, 93.07, 93.08

(56) References Cited

U.S. PATENT DOCUMENTS

| | | | | |
|---|---|---|---|---|
| 4,387,271 A | * | 6/1983 | Artom | 370/214 |
| 4,533,943 A | * | 8/1985 | Poirier | 348/14.01 |
| 5,675,375 A | * | 10/1997 | Riffee | 348/14.1 |
| 5,969,750 A | * | 10/1999 | Hsieh et al. | 348/14.1 |
| 6,201,562 B1 | * | 3/2001 | Lor | 348/14.01 |
| 6,209,025 B1 | * | 3/2001 | Bellamy | 709/217 |

* cited by examiner

Primary Examiner—Wing F. Chan

(57) ABSTRACT

The invention includes a telephone using the PSTN, a control module, an ADSL module, and an access and display unit. Using the above, conventional telephone lines are employed for providing a video telephone capable of bi-directional video and audio transmissions. The video telephone is connected with the PSTN, and under circumstances that a receiving party and a calling party are simultaneously using the video telephone, when a receiving party user dials telephone number of the receiving party where by the control module unit is activated to send a signal. Via the PSTN lines, an Internet protocol A or B obtained by the ADSL modules unit is sent to the control module unit of the receiving party or the calling party. The two parties are connected using the IPs sent through the PSTN, and a high frequency band of the ADSL is utilized for transmitting video information.

5 Claims, 2 Drawing Sheets

VIDEO TELEPHONE INTEGRATING PUBLIC-SWITCH TELEPHONE NETWORK AND ASYMMETRIC DIGITAL SUBSCRIBER LINE

BACKGROUND OF THE INVENTION (a) Field of the Invention

The invention relates to a video telephone integrating public-switch telephone network (PSTN) and asymmetric digital subscriber line (ADSL), and more particularly, to a phone device capable of bi-directional video and audio transmissions using conventional telephone lines (double-twist lines). Not only is PSTN, which serves as a telephone system for analog audio signals using copper wires, utilized for providing audio transmissions as common telephones, but also a high frequency band ranging from 25 KHz to 1 MHz of ADSL is used for accomplishing video information transmissions. Through a connection established by the PSTN, Internet protocol (IP) addresses and port addresses are transmitted in any form via the PSTN, including those of a receiving party to a calling part, and those of a calling party to a receiving party. Digital information is then transmitted via the Internet, thereby completing simultaneous and bi-directional video and audio transmissions between the receiving party and the calling party.

At the same time when using the Internet for transmissions, the PSTN may be disconnected or left connected.

Or, the PSTN may be employed for establishing an initial connection, and the Internet is then used for transmitting audio and video information between the receiving party and the calling party.

(b) Description of the Prior Art

Present analog public-switch telephone network (PSTN) plays a leading role in digital communications for being most complete in structure, and being most extensively used as well as inexpensive in price. In addition, the Internet that is rapidly advancing during the recent years, especially the world-wide-web (www), apart from offering conventional email transmissions, also realizes diverse multimedia services combining audio, graphics, and even dynamic video images. Thus, massive data are brought about along with these services. In order to acquire data accessing capabilities with higher transmission speeds, Internet service providers (ISP) have one after another proposed various schemes for increasing transmission speeds. As multimedia on the Internet gets more and more popular, it is only apparent that modems of 28.8, 33.6 or 56 kbps using conventional dial-up telephone networks become inadequate for users to keep up with the trend. Even, users of local networks and integrated system digital networks (ISDN) hardly consider speeds of their existing networks as satisfactory either.

Meanwhile, ~digital subscriber line (xDSL) is gradually turning into a target attention of the public. Literally, DSL is a kind of digital subscriber line, with asymmetric digital subscriber line (ADSL) being one of the most prominent xDSL techniques. The ADSL utilizes the contemporary PSTN (or, plain old telephone service, POTS) to transmit data in high transmission speeds without requiring augmentation of existing fundamental structural equipments and techniques. Related standards of ADSL have been established, and the ADSL is certainly to bring people considerable benefits. Again, ADSL literally means asymmetric digital subscriber line; that is to say, a high frequency band ranging from 30 KHz to 1 MHz over common telephone lines (copper telephone lines in households), is not overlapped with a low frequency band occupied by telephone audio signals. Therefore, both audio signals and data can be simultaneously transmitted for increasing transmission speeds.

Because ADSL utilizes present PSTN (POTS) lines for transmitting data with high transmission speeds, functions of conventional telephones are essential. Within a bandwidth of 1 MHz, a lowest bandwidth of 4 KHz (0 to 4 KHz) is adopted for conventional telephone services. This bandwidth of 4 KHz is separated by a passive filter called a POST splitter from the bandwidth of 1 MHz, and is especially reserved and tailored for conventional telephone services. The remaining portion from 100 KHz to 1.1 MHz then transmits computer data at a speed of 6 bits per second. Moreover, because a power supply that sends ADSL signals and POTS signals on a same line is provided by a telecommunication provider, the power supply is still available even if when the ADSL line malfunctions or a personal computer is shut down. Therefore, a user may still make phone calls using POTS channels by separating audio signals from ADSL signals. The ADSL separates conventional telephone services and computer data services to different channels, and hence it is ensured that telephone services function normally in cases of malfunctions or interruptions of ADSL services. To be more precise, telephones are able to function normally when multimedia transmissions are being performed via the ADSL.

Above all, owing to launches of various related products, communication bandwidths of the PSTN have been directly improved and user demands of PSTN have been indirectly lowered. Also, popularity of newly promoted communication networks are to remain quite limited in the near future, and thus the PSTN still stands as the mainstream among data communication networks.

SUMMARY OF THE INVENTION

The object of the invention is to provide a video telephone integrating public-switch telephone network (PSTN) and asymmetric digital subscriber line (ADSL) for bi-directional video and audio transmissions, in that the video telephone comprises a telephone and a control module unit of common PSTN system, an ADSL module unit, and an image access and display unit. The video telephone according to the invention is capable of bi-directional video and audio transmissions using conventional telephone lines (double-twist wires). Thus, while employing the PSTN for common telephone audio transmissions, video information is also transmitted using a high frequency band ranging from 25 KHz to 1 MHz of the ADSL. Through a connection between two telephones and established by the PSTN, Internet protocol (IP) addresses and port addresses are transmitted in any form via the PSTN, including those of a receiving party to a calling party, and those of a calling party to a receiving party. Digital information is then transmitted via the Internet, thereby completing simultaneous and bi-directional video and audio transmissions between the receiving party and the calling party.

DETAILED DESCRIPTION OF THE PREFERRED EMBODIMENTS

Figure 1:
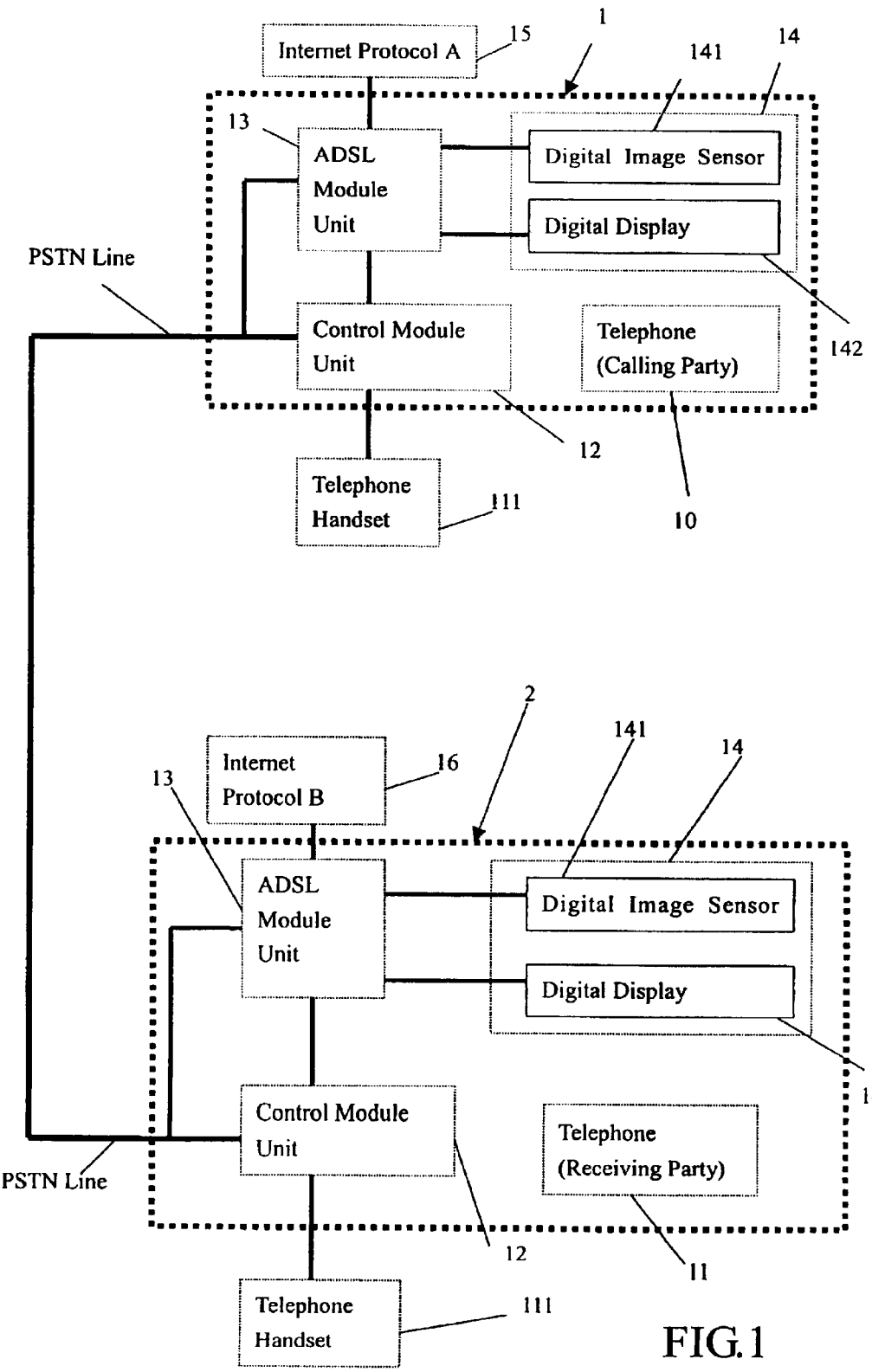
FIG. 1 shows a schematic view illustrating a fundamental structure of the video telephone according to the invention.

Referring to FIG. 1 showing a structure of the video telephone integrating public-switch telephone network (PSTN) and asymmetrical digital subscriber line (ADSL) according to the invention, telephones operating with PSTN systems serve as a main structure. Each of telephones 10 and 11 has basic analog audio transmission lines, a handset 111 for receiving and sending audio, and a dialing assembly (not shown in the diagram). A complete video telephone 1 comprises the telephone 10 operating with PSTN systems, a control module unit 12 connected with communication lines of the telephone 10, so as to enable audio transmissions of the PSTN telephone.

A complete video telephone 2 comprises the telephone 11 operating with PSTN systems; a control module unit 12 connected with communication lines of the telephone 10, so as to enable audio transmissions of the PSTN telephone to an Internet protocol (IP) address A 15 for connecting to an ADSL module unit 13 of the video telephone 1 at activation of the telephone; an ADSL module unit 13, which is connected with the PSTN network to obtain an IP address B 16, and to connect to the Internet using PSTN lines after receiving an activation signal of the control module unit 12, so as to develop digital data transmissions between a receiving party and a calling party; and an image access and display unit 14 connected with the ADSL module unit 13, and having an image sensor 141 and a display device 142. The image sensors 141 and the display devices 142 of both telephones 1, 2 are preferably capable of direct digital image signal transmissions, such that digital image signals are acquired by the image sensor 141, transmitted to the party at the other terminal via the ADSL module unit 13, and displayed at that terminal by the display device 142.

Apart from constructing a dial-up structure, the ADSL module unit 13 also combines 4 KHz POTS signals with xDSL signals, which are together transmitted to a user end via existing PSTN lines. A filter then separates the POTS signals from the digital signals, and the digital signals are modulated or decoded. The image sensor 141 of the access and display unit 14 may be a charge coupled device (CCD) element that directly accesses digital image signals, or certainly, may be a less costly complementary metal oxide semiconductor (CMOS) digital image sensor. Thus, digital image signals are accessed and transmitted using the ADSL module unit 13. The display device 142 may be a liquid crystal display (LCD), or other display devices that directly display digital image signals received.

From above, the video telephone 1 according to the invention is directly connected with PSTN lines. When a calling party user dials the telephone number of the receiving party using the handset 111 of the video telephone 1, the control module unit 12 is activated to send a signal. The signal commands the ADSL module unit 13 to connect to the Internet and obtain its IP address A 15. When the control module unit 12 of the video telephone 2 of the receiving party receives ringing signals of the calling party and becomes activated after a user picks up the handset 111, another signal is sent to command the ADSL module unit 13 to connect to the Internet and to further obtain its IP address B 16. Via the PSTN lines, the IP addresses A 15 and B 16 are sent to the control module unit 12 of the receiving party and the calling party respectively. For both the receiving party and the calling party, linkage is performed via the Internet using the IP addresses sent by the PSTN, and video data are bi-directionally transmitted and received between the calling party and the receiving party. Hence, common telephone audio transmission functions are accomplished by the PSTN, and at the same time, bi-directional video signal transmissions are also achieved between the receiving party and the calling party by transmitting video data using the high frequency band of the ADSL.

Figure 2:
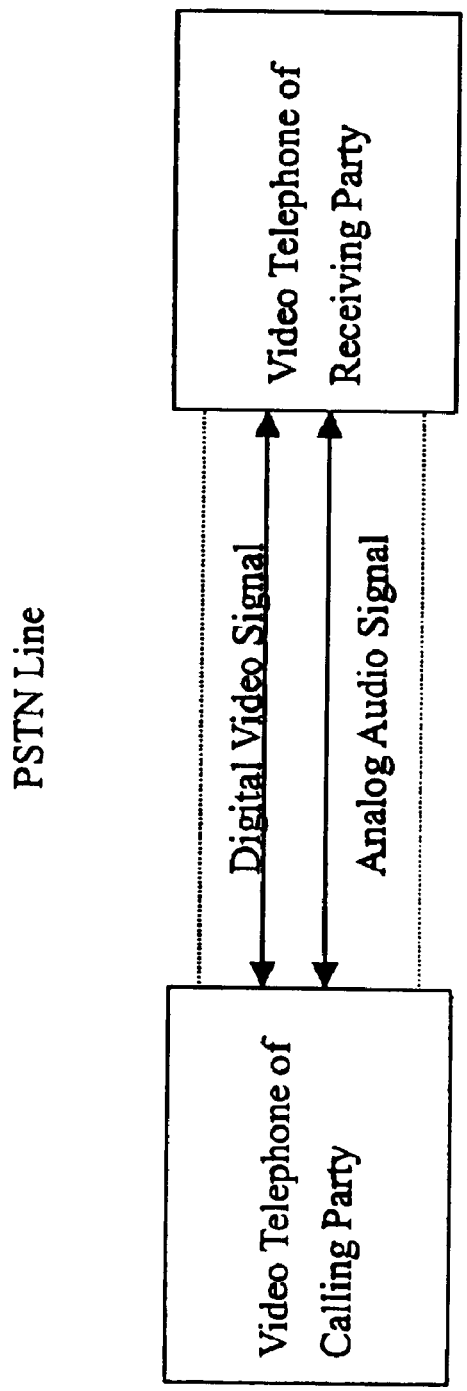
FIG. 2 shows a schematic view illustrating transmission status of audio and video transmissions of the video telephone according to the invention.

Referring to FIG. 2, common telephone audio transmission functions are accomplished by the PSTN. In addition, video signal transmissions are also achieved using the high frequency band ranging from 25 KHz to 1 MHz of the ADSL. Through a connection established by the PSTN, IP addresses and port addresses are transmitted in any form via the PSTN, including those of the receiving party to the calling part, and those of the calling party to the receiving party. Digital information is then transmitted via the Internet, thereby completing simultaneous and bi-directional video and audio transmissions between the receiving party and the calling party.

According to the aforesaid structure, simultaneous and bi-directional video and audio transmissions between the receiving party and the calling party are achieved. More particularly, the bi-directional video transmissions are completed merely by conventional dial telephones without requiring any changes in users' original dialing habits, and hence making operational conveniences of the invention even more outstanding.

The video telephone integrating PSTN and ADSL according to the invention, by integrating a common telephone and a control module unit of PSTN systems, an ADSL module unit, and an image access and display unit, provides a video telephone capable of bi-directional video and audio transmissions using conventional telephone lines (double-twist wires). Thus, while employing the PSTN for common telephone audio transmissions, video information is also transmitted using a high band ranging from 25 KHz to 1 MHz of the ADSL. Through a connection established by the PSTN, IP addresses and port addresses are transmitted in any form via the PSTN, including those of the receiving party to the calling part, and those of the calling party to the receiving party. Digital information is then transmitted via the Internet, thereby completing simultaneous and bi-directional video and audio transmissions between the receiving party and the calling party.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A video telephone integrating public-switch telephone network (PSTN) and asymmetric digital subscriber line (ADSL), comprising:

a telephone operating within the PSTN, wherein the telephone has basic analog audio transmission lines, a handset for receiving and sending audio, and a dialing assembly;

an ADSL module unit connected with the transmission lines, and for connecting to an internet through the transmission lines after being commanded; and an image access and display unit connected with the ADSL module unit, and having an image sensor and a display device, wherein the image sensor generates video signals to be transmitted by the ADSL module unit, and the display device displays video signals received by the ADSL module unit; and a control module unit connected with the transmission lines for communicating analog audio transmissions over the PSTN, and connected to the ADSL module unit, wherein in response to initiation or answering of a call of a another video telephone, the control module unit sends a signal to the ADSL module unit to command the ADSL module unit to connect to the internet and obtain an identifying address, the control module unit transmits the obtained identifying address to the other video telephone and receives an identifying address of the other video telephone, and the ADSL module unit uses the identifying address of the other video telephone to transmit video signals to the other video telephone through the internet.

2. The video telephone of claim 1, wherein the identifying address is an Internet (IP) protocol address or a port address.

3. The video telephone of claim 1, wherein the control module unit is capable of maintaining the internet connection of the ADSL module unit independent of the state of communication of analog audio transmissions.

4. The video telephone of claim 1, wherein the display device is a liquid crystal display (LCD).

5. The video telephone of claim 1, wherein the image sensor is a digital image sensor comprising a charge coupled device (CCD) or a complementary metal oxide semiconductor (CMOS) device.

* * * * *